June 16, 1953  F. G. BUHRENDORF  2,642,281
APPARATUS FOR THE WINDING OF ENDLESS BANDS
Filed Nov. 28, 1951
*FIG. 1*
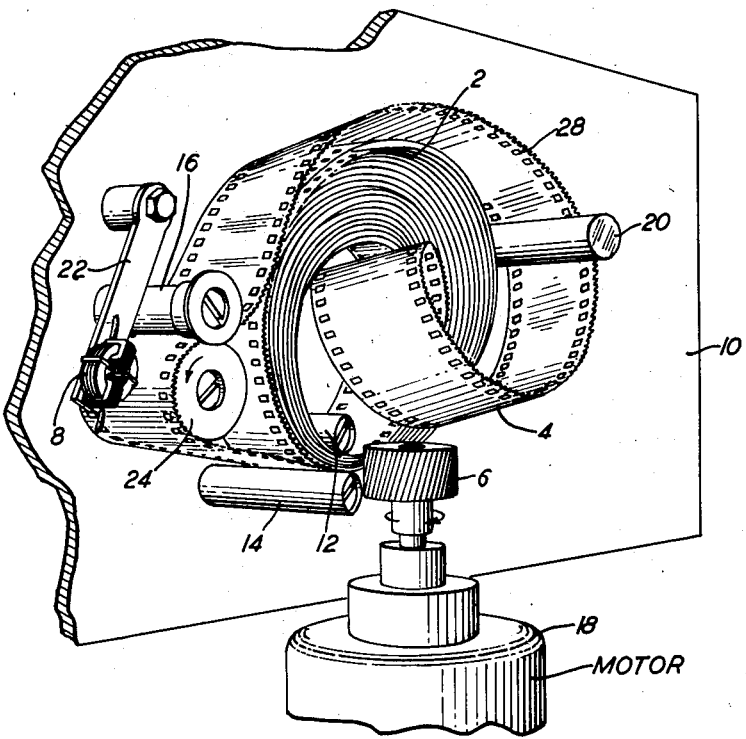
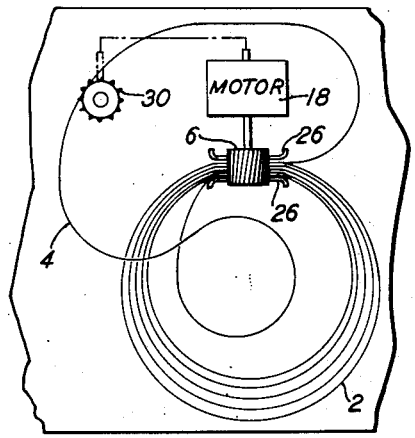
*FIG. 3*
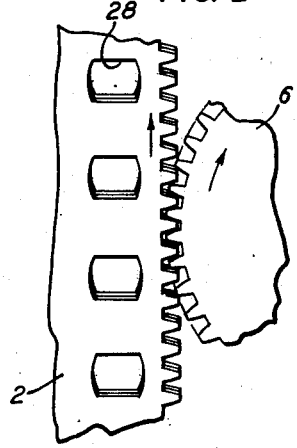
*FIG. 2*
INVENTOR
F. G. BUHRENDORF
BY
*V. P. Priolo*
ATTORNEY Patented June 16, 1953

2,642,281

UNITED STATES PATENT OFFICE 2,642,281

APPARATUS FOR THE WINDING OF ENDLESS BANDS

Frederick G. Buhrendorf, Westfield, N. J., assignor to Bell Telephone Laboratories, Incorporated, New York, N. Y., a corporation of New York Application November 28, 1951, Serial No. 258,570

5 Claims. (Cl. 271—2.18)

This invention relates to apparatus for continuously driving an endless band, and particularly to apparatus for continuously driving an endless band formed into a multilayered roll having a looped portion extending from the inner layer to the outer layer thereof.

It is an object of this invention to provide a drive for an "inside-outside" storage reel which will insure that each turn of the spiral remains a constant length and will not tighten up and snub on its adjacent turn.

This invention is particularly applicable to sound recording and reproducing systems of the magnetic type which employ tape or film as a record medium, and will hereinafter be described in that connection, though without limitation thereto since the invention may have application to systems utilizing record bands or tapes of other than magnetic character.

In accordance with the general features of this invention, the endless band or film, formed into a loosely wound multilayered roll, is provided with a serrated edge, and said film is driven by a device comprising a gear having teeth which conform to the serrations on the edge of said film and simultaneously engage the serrated edges of all the layers of the multilayered roll.

These and other features of the invention will be more clearly understood from the following detailed description and the accompanying drawings in which:

Fig. 1 is a view in perspective illustrating the cooperation between the serrated edges of the layers of the loosely wound multilayered endless band and the teeth of the driving gear in accordance with the present invention.

Fig. 2 is a detail view showing the serrated edges of the layers of the multilayered roll engaged by the teeth of the driving gear; and Fig. 3 is a schematic view of an arrangement in which the driving mechanism shown in Fig. 1 and a sprocket, for directing the film to a projector or other device more distantly located than the sound head shown in Fig. 1, are actuated by the same motor.

Referring now to the accompanying drawings, 2 is an endless band having a serrated edge and formed into a loosely wound multilayered roll having a looped portion 4 extending from the inner layer to the outer layer thereof. The serrated edges of all the layers of the loosely wound multilayered roll are aligned in such manner as to be engaged simultaneously by the drive gear 6. In the particular embodiment of the invention shown in Fig. 1, 2 is a standard film coated with a material suitable for the magnetic recording of signals directed to the magnetic recording-reproducing head 8. Mounted on the plate 10 are idlers 12, 14 and 16. Idlers 12 and 14 support the multilayered roll and control the thickness of the pile at the point where the layers are engaged by the drive gear to insure the simultaneous engagement and rotation of all the layers of the multilayered roll by the teeth of the drive gear 6. The drive gear 6 is actuated by the motor 18. Also mounted on the plate 10 is the rod 20 which acts as a support and guide for the transport loop 4 of the endless band 2, and the arm 22 which acts as a support for the magnetic head 8. It is to be understood that the magnetic head 8 may be one of a plurality of recording heads employed to produce individual records on a plurality of independent adjacent lanes, or it may be mounted in such manner as to be capable of traversing the band or film supported on the roller 24 to produce a record in the form of a helix.

In Fig. 2 it is more clearly shown that the serrations on the edge of the endless band are in the form of teeth which conform to the teeth of the drive gear 6.

For those applications where the endless band is not passed under a sound head located close to the multilayered roll and a transport loop of greater length than the one used in the embodiment shown in Fig. 1 is required, an arrangement of the type shown in Fig. 3 may be employed. The endless band or film is wound in a loose spiral and fed through fairly snug fitting guide shoes 26 at which point all the layers of the multilayered roll are driven simultaneously by the drive gear 6. The sprocket holes 28 in the film loop 4 are engaged by the sprocket 30 which also may be driven by the motor 18, the speed of the sprocket being regulated to feed the film at the rate established by the drive gear 6.

The arrangements shown in Figs. 1 and 3 may be used for reproducing as well as recording the signal on the film record medium. In this connection it is possible to minimize the distortion of speech recorded on the moving record medium by making the over-all length of the record medium an integral multiple of the circumference of each of the rotating shafts entering into the drive such as the pitch circumference of the drive gear 6 and the pitch circumference of the sprocket 30. The speed variations in the drive will be the same for the recording and reproduction of the signal, and there will be a tendency to cancel the flutter effect and thereby reduce the distortion in the recorded signal.

The distortion of speech recorded on the moving record medium may also be minimized by regulating the speed of the drive gear teeth and/or the sprocket teeth so that the flutter rates appearing in the drive are either below or above the range where flutter is most noticeable in speech. Satisfactory results may be obtained when the flutter rates are below 5 cycles or above 50 cycles.

It is to be understood that the above-described arrangements are illustrative of the application of the principles of the invention. Other arrangements may be devised by those skilled in the art without departing from the spirit and scope of the invention.

What is claimed is:

1. In a system employing a moving endless band, an endless band having a serrated edge and formed into a loosely wound multilayered roll having a looped portion extending from the inner layer to the outer layer thereof, two supporting members between which said roll is disposed in such manner that one of said members is in contact with said looped portion at the point where said looped portion joins the outer layer of said roll, the other of said members is in contact with said looped portion at the point where said looped portion joins the inner layer of said roll, and each of the layers of said roll disposed between said members is in contact with the layers adjacent thereto, a rotating drive gear, said gear having teeth which conform to the serrations on the edge of said band and being disposed in such manner as to engage said serrations at the point where said layers are disposed between said supporting members, the serrated edges of all the layers of said roll being aligned at the point where said layers are disposed between said supporting members in such manner as to be engaged simultaneously by said drive gear.

2. A system in accordance with claim 1 wherein the overall length of the endless band is an integral multiple of the pitch circumference of the drive gear.

3. A device for winding an endless band having a serrated edge and formed into a loosely wound spiral having a looped portion extending from the inner turn to the outer turn thereof comprising two supporting members for said band, said supporting members being adapted to be disposed about said spiral in such manner that one of said members is in contact with said looped portion at the point where said looped portion joins the outer turn of said spiral, the other of said members is in contact with said looped portion at the point where said looped portion joins the inner turn of said spiral, each of the turns of said spiral is disposed between said members and each of said turns disposed between said members is in contact with the turns adjacent thereto, and a rotating drive gear, said gear having teeth which conform to the serrations on the edge of said band and being disposed in such manner as to engage said serrations at the point where said turns are disposed between said supporting members, the serrated edges of all the turns of said spiral being aligned at the point where said turns are disposed between said supporting members in such manner as to be engaged simultaneously by said drive gear.

4. In a recording-reproducing system employing an endless film having a serrated edge and formed into a loosely wound multilayered roll having a looped portion extending from the inner layer to the outer layer thereof, two supporting members for said film, said supporting members being adapted to be disposed about said roll in such manner that one of said members is in contact with said looped portion at the point where said looped portion joins the outer layer of said roll, the other of said members is in contact with said looped portion at the point where said looped portion joins the inner layer of said roll, each of the layers of said roll is disposed between said members and each of said layers disposed between said members is in contact with the layers adjacent thereto, a rotating drive gear, said gear having teeth which conform to the serrations on the edge of said film and being disposed in such manner as to engage said serrations at the point where said layers are disposed between said supporting members, the serrated edges of all the layers of said roll being aligned at the point where said layers are disposed between said supporting members in such manner as to be engaged simultaneously by said drive gear, and a rotating sprocket disposed in such manner as to engage the looped portion of said roll, said sprocket rotating at the speed required to maintain the rate of travel established for said looped portion by said drive gear.

5. A system in accordance with claim 4 wherein the overall length of the endless film is an integral multiple of the pitch circumference of the drive gear and an integral multiple of the pitch circumference of the sprocket.

FREDERICK G. BUHRENDORF.

References Cited in the file of this patent

UNITED STATES PATENTS

| Number | Name | Date |
|---|---|---|
| 272,446 | Ballew | Nov. 1, 1887 |
| 697,874 | Oldham | Apr. 15, 1902 |
| 1,991,394 | Klein | Feb. 19, 1935 |
| 2,398,639 | Heyer | Apr. 16, 1946 |
| 2,432,200 | Lasky | Dec. 9, 1947 |